United States Patent [19]

Baumgartner et al.

[11] Patent Number: 5,353,896

[45] Date of Patent: Oct. 11, 1994

[54] DISK BRAKES FOR MOTOR VEHICLES

[75] Inventors: Hans Baumgartner, Moosburg; Klaus Hirschler, Neu-Esting/Olching; Johann Iraschko, Reisdorf; Otto Schullerus, München, all of Fed. Rep. of Germany

[73] Assignee: Knorr-Bremse Systeme Feur Nutzfahrzeuge, Munich, Fed. Rep. of Germany

[21] Appl. No.: 952,502

[22] PCT Filed: May 15, 1991

[86] PCT No.: PCT/DE91/00402

§ 371 Date: Feb. 8, 1993

§ 102(e) Date: Feb. 8, 1993

[87] PCT Pub. No.: WO91/19115

PCT Pub. Date: Dec. 12, 1991

[51] Int. Cl.$^5$ .................. F16D 65/56; F16D 65/16
[52] U.S. Cl. .................. 188/71.9; 188/196 D; 188/196 V
[58] Field of Search .......... 188/196 R, 196 D, 196 V, 188/71.8, 71.9, 79, 79.62, 79.55; 192/111 A

[56] References Cited

U.S. PATENT DOCUMENTS

4,351,419 9/1982 Garrett et al. ............. 188/196 D X
4,374,551 2/1983 Birkenbach et al. ............. 188/71.9
4,399,894 8/1983 Tribe ............. 188/71.9

Primary Examiner—Robert J. Oberleitner
Assistant Examiner—Kevin D. Rutherford
Attorney, Agent, or Firm—Pollock, Vande Sande & Priddy

[57] ABSTRACT

The disk brake with a caliper (2) reaching over a brake disk (1) exhibits on one side a clamping mechanism. The clamping mechanism includes a cam lever (4), which can be rotated around an axis parallel to the plane of the brake disk and interacts preferably by way of a traverse (6) with one or two adjusting spindles (7, 8), against which a brake lining (10) is braced. The two adjusting spindles (7 and 8) are coupled by means of a toothed belt (12). Into a recess of the one adjusting spindle (7) projects a rotating drive (14), which can be driven by the cam lever (4) and during the application stroke causes the adjusting spindle (7) and thus by way of the toothed belt (12) also the adjusting spindle (8) to be screwed in the direction of approach to the brake disk (1). The rotating drive (14) includes a one-way revolving coupling and a torque limiting coupling, thus preventing a screw connection of the adjusting spindles (7 and 8) during the fixed brake stroke and the release stroke.

23 Claims, 4 Drawing Sheets

DISK BRAKES FOR MOTOR VEHICLES

FIELD OF THE INVENTION

The invention relates to a disk brake for motor vehicles, in particular street vehicles, with a caliper which reaches over a brake disk and one side of which has a clamping mechanism with a cam lever which can be swivelled around an axis of rotation extending parallel to the plane of the brake disk and whose cam is coupled in the direction of movement at substantially right angles to the plane of the brake disk to at least one adjusting spindle. The adjusting spindle extends at substantially right angles to the plane of the brake disk and is screwed adjustably to the cam or a spacer which can be moved by the cam and against whose brake disk-sided end is braced a brake lining. The brake lining is movable relative to the caliper transversely to the brake disk. To adjust the releasing play, a rotating drive actuated by a swivel stroke of the cam lever is provided for the adjusting spindle.

BACKGROUND OF THE INVENTION

Disk brakes of this type are well known in the prior art. Usually there is only one adjusting spindle on which the cam, arranged symmetrically relative to its axial direction, acts and which can be screwed down by means of any kind of drive during an excessive brake stroke. However, disk brakes with two adjusting spindles are also already known from DE-OS 36 10 569 and 37 16 202; these are screwed to the ends of a traverse extending parallel to the plane of the brake disk; the cams engage with the longitudinal center of the traverse which can be moved at substantially right angles to the plane. These disk brakes are equipped with a synchromesh device for the two adjusting spindles, which device may have a toothed belt or chain drive which couples the adjusting spindles relatively non-rotatably directly or by means of gear wheels. In these known disk brakes, the play is adjusted by converting the swivel movements of the cam lever into movements of the toothed belt, a process that is carried out by means of a friction drive from the cam lever to a deflecting roller for the toothed belt or by means of a pawl-like spring mounted on the cam lever and interacting with the toothed belt. Thus, in the two known designs, the toothed belt and/or the synchromesh device must transfer the forces for the simultaneous resetting of both adjusting spindles, whereby the toothed belt and/or the synchromesh device can be severely stressed.

SUMMARY OF THE INVENTION

The object of the invention is to design a disk brake of the aforementioned kind with simple means in such a manner that with reliable and functional reset behavior the rotating drive for the adjusting spindle is arranged optimally for assembly and installation and can be designed as a compact module, wherein, when a synchromesh gear is present, the synchromesh gear and/or the toothed belt is/are stressed by only moderate forces during reset operations, in particular is/are relieved of its/their function as a reset control member.

This problem is solved according to the invention by arranging the rotating drive essentially in an axial open recess which faces away from the brake disk and belongs to the adjusting spindle, and by coupling an output member of the rotating drive to the adjusting spindle so as to be relatively non-rotatable, but axially movable. If two adjusting spindles and one traverse are present, only one of the adjusting spindles can be coupled, according to another feature of the invention, directly to a rotating drive which can be driven by the cam lever by way of a swivel drive. The synchromesh device serves as the rotating drive for the other adjusting spindle.

BRIEF DESCRIPTION OF THE DRAWINGS

The drawings show the essential parts of the preferred embodiments for disk brakes designed according to the invention.

DESCRIPTION OF THE PREFERRED EMBODIMENT

Figure 1:
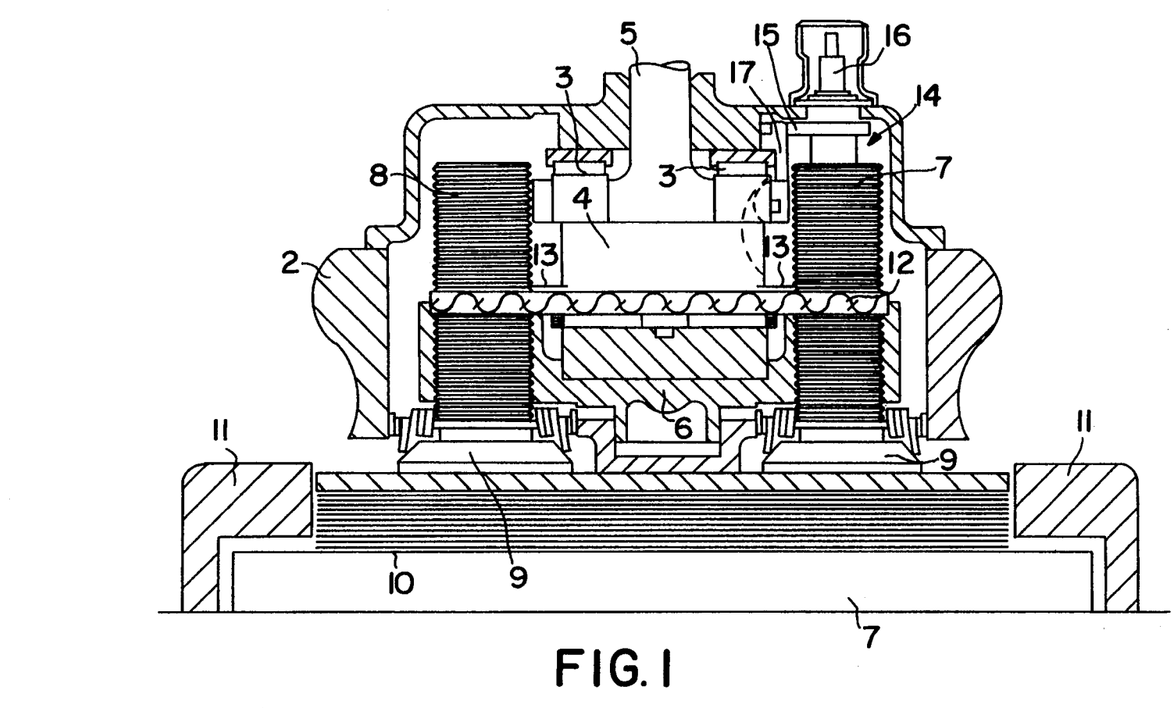
FIG. 1 shows the clamping mechanism in a caliper, which is cut open, for a disk brake with two adjusting spindles coupled by means of a synchromesh device.

FIG. 1 shows a brake disk 1, over which a caliper 2 reaches, of which only one part, receiving the clamping mechanism and located to one side of the brake disk 1, is shown. The caliper is designed and mounted conventionally in the remaining part. In the caliper 2 a cam lever 4 can be swivelled by means of roller bearings 3, shaped approximately like half shells, around an axis of rotation extending parallel to the plane of the brake disk 1; the cam lever 4 is driven by way of a lever 5, whose end can be coupled to the piston of a brake cylinder, mounted on the caliper 2, or to a mechanical brake linkage. It is advantageous for the installation of the disk brake if the lever 5 extends steeply upwardly from the drawing plane of FIG. 1. On the other hand, the cam lever 4 is coupled by means of its cam to a traverse 6, which extends parallel to the plane of the brake disk 1 within the caliper 2, and can be moved perpendicularly to this plane. Each of the two ends of the traverse 6 is screwed adjustably to one adjusting spindle 7 or 8; the two adjusting spindles 7 and 8 extend within the caliper 2 perpendicularly to the plane of the brake disk 1 and terminate facing it with thrust pieces 9, on which rests a brake lining 10, which can be pressed against the brake disk 1. The brake lining 10 can be moved especially in the circumferential direction of the brake disk 1 at mountings 11 and transversely to the brake disk 1; the mounting 11 can be part of the caliper 2 or a stationary brake anchor plate. The two adjusting spindles 7 and 8 comprise axial teeth which intersect the thread or the spindles, and with which a toothed belt 12 meshes that couples non-rotatably the two adjusting spindles 7 and 8. The traverse 6 has holding members 13 to guide the toothed belt 12.

The adjusting spindle 7 (on the right in FIG. 1) is provided with a rotating drive 14, which is located essentially in an axial open recess, which faces away from the brake disk and belongs to the adjusting spindle 7, and projects facing away from the brake disk out of the adjusting spindle 7, bears there a radially bulging drive lever 15, is mounted (in a manner to be explained below in greater detail) on the caliper 2 so as to be cardanically deflectable, and can terminate with a drive journal 16, which can be accessed from the outside. The free end of the drive lever 15 acts together with a stop pin 17, which is mounted on the cam lever 4.

The caliper 2 can be moved in the usual manner relatively transversely to the brake disk 1 and bears a brake lining (not shown) which, opposite the brake lining 10, can be forced against the brake disk 1.

Figure 2:
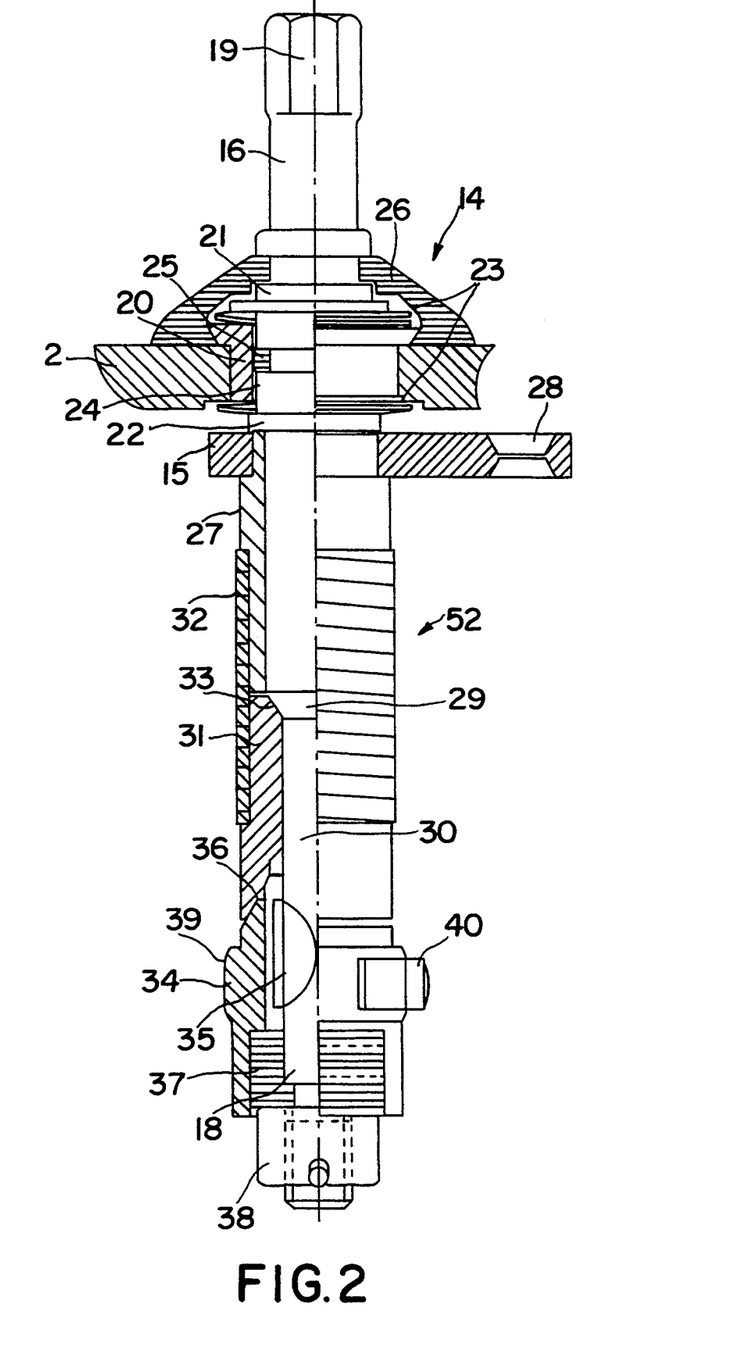
FIG. 2 shows a first embodiment.

The rotating drive 14, shown in FIG. 2, for the adjusting spindle 7 includes a spindle 18 which extends over the entire length of the rotating drive and which terminates in a drive journal 16 which bears the extension surfaces 19 for a rotating tool (not shown), for example a wrench. For the cardanically deflectable mounting on the caliper 2, the spindle 18 has adjacent the drive journal 16, on both sides of a bushing 20, mounted on the caliper 2 and through which said bushing reaches with play, one flange 21 or 22 each, between which and the bushing 20 or the caliper 2 cup springs 23 are clamped. The play of the spindle 18 in the bore 24 of the bushing 20 is bridged by a sealing ring 25 mounted on the spindle 18. A hood 26, made or elastic material, is mounted on the bushing 20 and is snapped on the spindle 18, and protects the mounting of the spindle 18 from contamination. Adjacent the flange 22 within the caliper, a first bushing 27 which non-rotatably carries the drive lever 15 is rotatably mounted on the spindle 18. The free end of the drive lever 15 is provided with a bore 28 into which the stop pin 17 (not shown in FIG. 2) extends. The coupling of the drive lever 15 and the stop pin 17 may also be in the form of a spherical head or fork. Subsequently, a conical bushing 31 can be rotated as a second bushing on the first bushing 27 on a part 30 of the spindle 18 that tapers by way of a conical section 29. The two bushings 27 and 31 that terminate a short distance apart have identical outer diameters on the sections facing each other and are enclosed at these sections by a loop spring 32 with radial pre-stress. Internally the conical bushing 31 has a conical surface that is adequate relative to the section 29 and thus forms with the conical surface a conical coupling 33. Following the conical bushing 31, an output bushing 34 is mounted on the spindle 18. This output bushing can be moved axially by means of a disk spring 35, engaging with aligning grooves of the spindle 18 and the output bushing 31, and cannot be rotated relative to the spindle 18. The conical bushing 31 and the output bushing 34 abut by means of conical surfaces forming a conical coupling 36. Subsequently, at the output bushing 34 the spindle 18 penetrates a pre-stress spring 37, which is clamped between the output bushing 34 and a nut 38, screwed adjustably to the spindle 18; thus, the pre-stress spring 37 stresses the two conical couplings 36 and 33 in the closing direction. The output bushing 34 bears on the outside a spherical section 39 which protrudes slightly radially and with which said bushing is guided in the axial bore of the adjusting spindle 7 (not shown in FIG. 2). On the sides of the nut 38 the adjusting spindle 7 projects above the rotating drive 14 and envelops the latter as far as close to the drive lever 15. The axial bore of the adjusting spindle 7 has longitudinal grooves (not apparent from the drawing), into which reach radial bolts 40 sunk movably into the output bushing 34 in the region of its section 39. Thus, the radial bolts 40 couple non-rotatably, but longitudinally movably, the output bushing 34 with the adjusting spindle 7. Uniformly distributed over the circumference, several longitudinal grooves can be expediently provided in the adjusting—spindle 7 and the radial bolt 40 at the output bushing 34.

The loop spring 32 acts as a one-way rotating coupling 52, which, upon rotating the drive lever 15 in one direction of rotation, causes a freewheel between the first bushing 27 and the conical bushing 31, and in the opposite direction of rotation, a fixed turning connection between these two bushings. Torques acting on the conical bushing 31 are transferred, on the one hand, by way of the conical coupling 36 directly and, on the other hand, by way of the conical coupling 33, the spindle 18 and the disk spring 35 indirectly to the output bushing 34. In so doing, the transferable torque depends on the prestress of the pre-stress spring 37 and, thus, can be set by adjusting the nut 38.

The disk brake described above works as follows:

In the release state of the disk brake, the brake lining 10, like the opposite brake lining (not shown) has air play relative to the brake disk 1. To clamp the disk brake, the cam lever 4 is swivelled around the roller bearing 3 by means of the lever 5, thus moving the traverse 6 in the direction of the brake disk 1. The traverse 6 carries along the adjusting spindles 7 and 8, screwed to the traverse and the brake lining 10 by means of thrust pieces 9. By suitably designing the cam of the cam lever 4 which acts on the traverse 6 when the cam lever 4 is moved, a slight force that increases to high values with the movement is transferred between the cam lever 4 and brake lining 10. As a consequence of its mounting on the caliper 2, since the rotating drive 14 does not follow the axial displacement of the adjusting spindle 7, there is a relative axial displacement between the two.

When the cam lever 4 moves, it carries with it the stop pin 17, which, owing to its action in the bore 18, rotates the drive lever 15. This rotation is transferred by way of the first bushing 27 and the loop spring 32, blocking in this direction of rotation, to the conical bushing 31. Until the friction linings 10 rest on the brake disk 1, the kinetic resistance is only slight; a screw connection between the traverse 6 and the adjusting spindles 7 and 8 in the direction of movement of the latter toward the brake disk 1 is therefore also possible without significant kinetic resistance. Thus, the rotation of the conical bushing 31 can be transferred by way of the conical coupling 36 and the conical coupling 33 and the disk spring 35 to the output bushing 34, which transfers the rotation by means of its rotating coupling through the radial bolts 40, engaging the longitudinal grooves of the adjusting spindle 7, to the adjusting spindle 7 in the direction of its screwed connection toward the disk brake 1. The rotation of the adjusting spindle 7 is transferred by means of the toothed belt 12 to the adjusting spindle 8, which consequently screws, in the same amount as the adjusting spindle, 7, in the direction of the brake disk 1 relative to the traverse 6. As soon as the brake lining 10 and, following a slight, opposite movement of the caliper 2, also the opposite brake lining rest on the brake disk 1 or are pressed against the brake disk with still modest force, as a result of the displacement of the traverse 6, caused by the movement of the cam lever 4, in connection with the aforementioned relative screw connection between the adjusting spindles 7 and 8 and the traverse 6, there is a kinetic resistance, which counteracts the further movement of the brake lining and increases rapidly to high values. Additional secure clamping of the disk brake can occur only with elastic deformation of its parts, in particular also of the caliper 2 and the friction linings 10. When the cam lever 4 continues to move following application of the brake linings 10, the conical bushing 31 continues to rotate due to the stop pin, by way of the drive lever 15 and the loop spring 32, and as a result of the high kinetic resistance, which also acts as a resistance to the screw connection between the adjusting spindles 7 and 8 and the traverse 6, the conical couplings 33 and 36 also slide through at this stage. Thus, the output bushing 34 does not experience any additional rotation and there is no additional relative screwing between the adjusting spindles 7 and 8 and the traverse 6 during the fixed brake stroke. Thus, a relative screw connection between the adjusting spindles 7 and 8 and the traverse 6 occurs only during the application stroke from the release state up to the abutment of the brake linings, thereby releasing play of the disk brake independently of its elastic deformations occurring during the subsequent fixed brake stroke.

During these operations the toothed belt 12 is stressed only by the drive forces for the one adjusting spindle 8.

Upon subsequent release of the disk brake, the cam lever 4 is swivelled back, and therefore the drive lever 15 is suitably turned back by way of the stop pin 17. This turning back takes place in the unlocking direction of the loop spring 32, so that it is not transferred from the first bushing 27 to the conical bushing 31; thus, the latter and the spindle 18 and the output bushing 34 and the adjusting spindles 7 and 8 do not experience any rotation. The non-turning of the conical bushing 31 and the spindle 18 and the output bushing 34 is supported by the friction lock of the spindle 18 to the caliper 2, which is present in the region of the mounting of the first on the latter.

To replace worn friction linings 10, the disk brake must be reset by hand. To this end, the adjusting spindles 7 and 8 must be rotated in the locking direction of the loop spring 32, an operation that can be done by applying a suitable rotating tool, for example a wrench, to the extension surface 19. When the spindle 18 is rotated manually, the output bushing 34 is carried along by way of the disk spring 35; at the same time the two conical couplings 33 and 36 slide through, since the conical bushing 31 is prevented from also rotating by means of the drive lever 15, which is securely held by the stop pin 17, and the loop spring 32. The adjusting spindle 7, and due to its coupling by means of the toothed belt 12 to the adjusting spindle 8, also the latter are screwed relative to the traverse 6 in the direction away from the brake disk 1.

Figure 3:
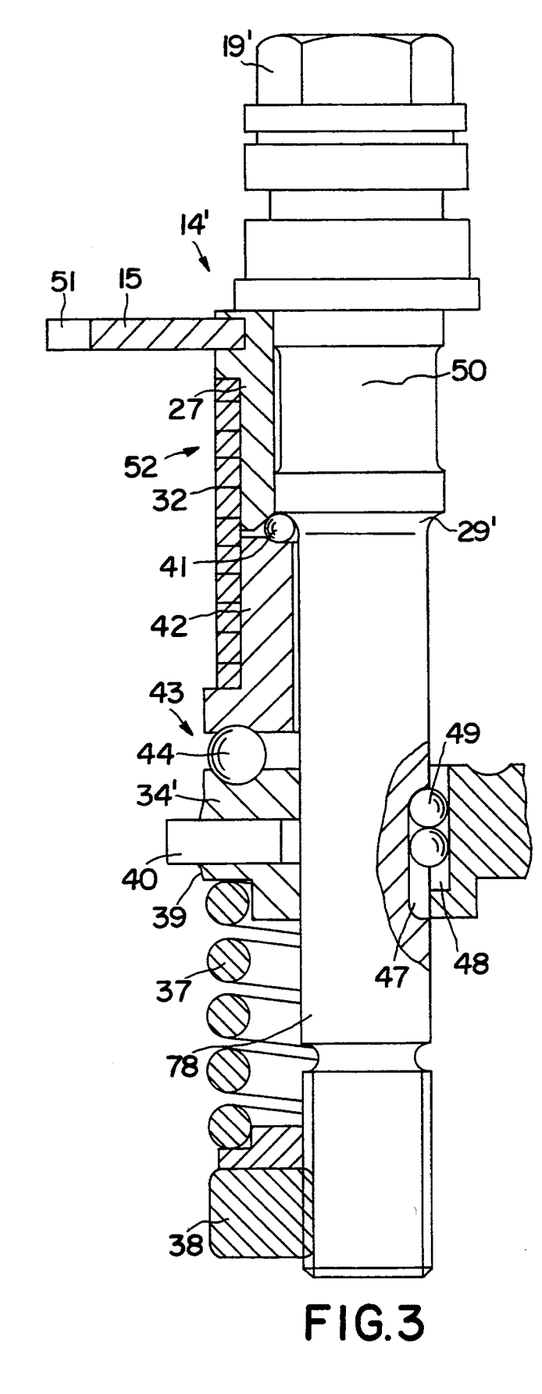
FIG. 3 shows a second embodiment for a rotating drive of an adjusting spindle.

Instead of the rotating drive 14 according to FIG. 2 that is equipped with a double conical coupling 33, 36, it is possible to provide a rotating drive 14' according to FIG. 3 that is equipped with spherical slopes, whose integration into the disk brake corresponds totally to the description with respect to FIG. 1. Its basic construction and operating mode are also very similar to the rotating drive 14 according to FIG. 2; therefore, matching parts are provided with identical reference numerals.

Figure 4:
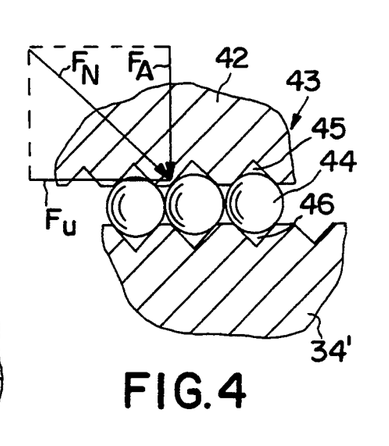
FIG. 4 shows a detail of FIG. 3 from a modified viewing direction.

The rotating drive 14' according to FIG. 3 includes a spindle 18, whose end, facing away from the brake disk and protruding beyond the adjusting spindle 7, is provided with a hexagonal head 19' serving as the extension surface. In accordance with the one spindle according to FIG. 2, the spindle 18 is mounted on the caliper 2 so as to be cardanically deflectable. This mounting is not shown in FIG. 3. Following the cardanic mounting, the first bushing 27, which is connected twist-proof to the drive lever 15, is mounted pivotally on the spindle 18. The section 29' of the spindle 18 is formed as the race for the balls of an axial bearing 41. The axial bearing 41 rotatably braces an approach bushing 42 which serves as a second bushing, in the axial direction to the first bushing 27 against the spindle 18, and simultaneously holds the first bushing 27 in its axial position. The two bushings 27 and 42 are coupled together by means of the loop spring 32 serving as the one-way revolving coupling 52. Facing away from the first bushing 27, the face of the approach bushing 42 is coupled by way of a spherical approach coupling 43 to the output bushing 34', which is mounted subsequently non-rotatably, but axially movably on the spindle 18. The spherical approach coupling 43 has between the faces of the approach bushing 42, which face each other, and the output bushing 34', integrated balls 44, which engage in the depressions 45 or 46 of the two bushings 42 and 34', these depressions facing each other and following in succession in the circumferential direction. From FIG. 4, which is a fragmentary view extending in the circumferential direction, it is apparent that the depressions 45 and 46 according to this embodiment are conical or splined with inclined abutting surfaces for the balls 44. For a twist-proof longitudinal guide, the spindle 18 and the output bushing 34' exhibit longitudinal grooves 47 and 48 that face each other and with which blocking balls 49 engage. In the region of its spherical section 39, output bushing 34' has radially bulging radial bolts 40 which extend into the longitudinal grooves (not illustrated) of the adjusting spindle 7. The output bushing 34' is stressed in the direction of contact with the approach bushing 42 by the pre-stress spring 37, whose prestress can be adjusted by means of the nut 38 screwed adjustably to the spindle 18.

To simplify the drawing with the exception of the output bushing 34', FIG. 3 shows only those sections located to the left of the axis 50 of for those parts located on the spindle 18.

The function of a disk brake, equipped according to FIG. 3 with the rotating drive 14', largely corresponds to that according to FIG. 2, except that sliding friction subject to wear is largely replaced by rolling friction. During the brake application stroke, the drive lever 15 and the first bushing 27 are rotated by the stop pin 17, extending into the fork 51 of the drive lever. This rotation is transferred by way of the loop spring 32 to the approach bushing 42. Axial clamping between the approach bushing 42 and the output bushing 34' by means of the pre-stress spring 37 impedes the balls 44 of the spherical approach coupling 43, serving as the torque limiting coupling, up to a limit value of the torque to be transferred from the approach bushing 42 to the output bushing 34', from running up the walls of the depressions 45 and 46, which would pause the approach bushing 42 and the output bushing 34' to spread apart. As a consequence, with small torque to be transferred during the application stroke, the output bushing 347 is also rotated, the radial bolts 40 carry along the adjusting spindle 7 and, by means of the toothed belt also the adjusting spindle 8, and both adjusting spindles 7 and 8 are screwed relative to the traverse 6 in the approach direction to the brake disk 1.

When resistance to screwing and movement occurs after the friction linings 10 are positioned on the brake disk 1, the aforementioned torque limit is exceeded, so that during the fixed brake stroke the balls 44 run up the inclined walls of the depressions 45 and 46. However, the fixed brake stroke is relatively small, not all of the balls 44 run out of their respective depressions 45 and 46, so that normally running over does not occur. When the balls 44 run up, the output bushing 34' yields downwardly, according to FIG. 3, as enabled by the blocking balls 49 with only little friction. When the balls 44 run up the inclined abutting surfaces and the upper edges of the depressions 45 and 46, there is a change in the direction of the normal force $F_N$, which acts between both depressions and which can be separated into the axial force $F_A$ exerted by the pre-stress spring 37 and the circumferential force Fu; circumferential force Fu is defined by the torque acting between the approach bushing 42 and the output bushing 34'. The change in direction of the normal force $F_N$ that occurs when the balls 44 run up the edges of the depressions 45 and 46 results in reducing the circumferential force Fu; thus, the torque which can be transferred between approach bushing 42 and output bushing 34' decreases, and correspondingly the resistance to turning for the drive lever 15. The result is a stress which decreases with the torsion angle between the approach bushing 42 and the output bushing 34', and thereby protection of the drive elements of the rotating drive 14'.

When the disk brake is released, the balls 44 run back initially into their depressions 45 and 46 while the drive lever 15 is turned back. When the drive lever 15 is turned back further, the loop spring 32 is released and uncouples the first bushing 27 from the approach bushing 42, so that the latter does not rotate any further. The output bushing 34' does not rotate.

Even with the rotating drive 14' according to FIG. 3, the lift stroke of the disk brake is reset during the application stroke during the braking process. Elastic deformations occurring during the braking have no impact.

For manual resetting when replacing the lining, the hexagonal head 19' is rotated in such a manner that, when the adjusting spindle 7 and, by way of the toothed belt 12, the adjusting spring 8 are carried along by means of the blocking balls 49 and the radial bolts 40, the adjusting spindles are screwed in the direction away from the brake disk 1 relative to the traverse 6. When the spindle 18 is rotated, the balls 44 slide from one depression 45 or 46 to the other, subject to the oscillating axial movement of the output bushing 34'.

In rotating drive 14, 14' according to both FIG. 2 and FIG. 3, the drive-linkage from the stop pin 17 up to the adjusting spindle 7 has unavoidable rotating play acting during the release stroke. The action of the stop pin 17 in the drive lever 15 is particularly subject to play, and a certain small relative twist between the first bushing 27 and the conical and approach bushing 31 or 42 may be necessary in order to transfer the torque by means of the loop spring 32. The result is that resetting which holds the brake linings 10 pressed against the brake disk 1 in the release state cannot occur; i.e., positive release is always assured.

Of course, combinations of the rotating drive 14 and 14' are also possible. Specifically, output bushing 34 may be provided with a non-rotatable longitudinal ball guide by means of blocking balls 49, or the output bushing 34' may be provided with a disk spring for its twist-proof longitudinal guide to the spindle 18.

Figure 5:
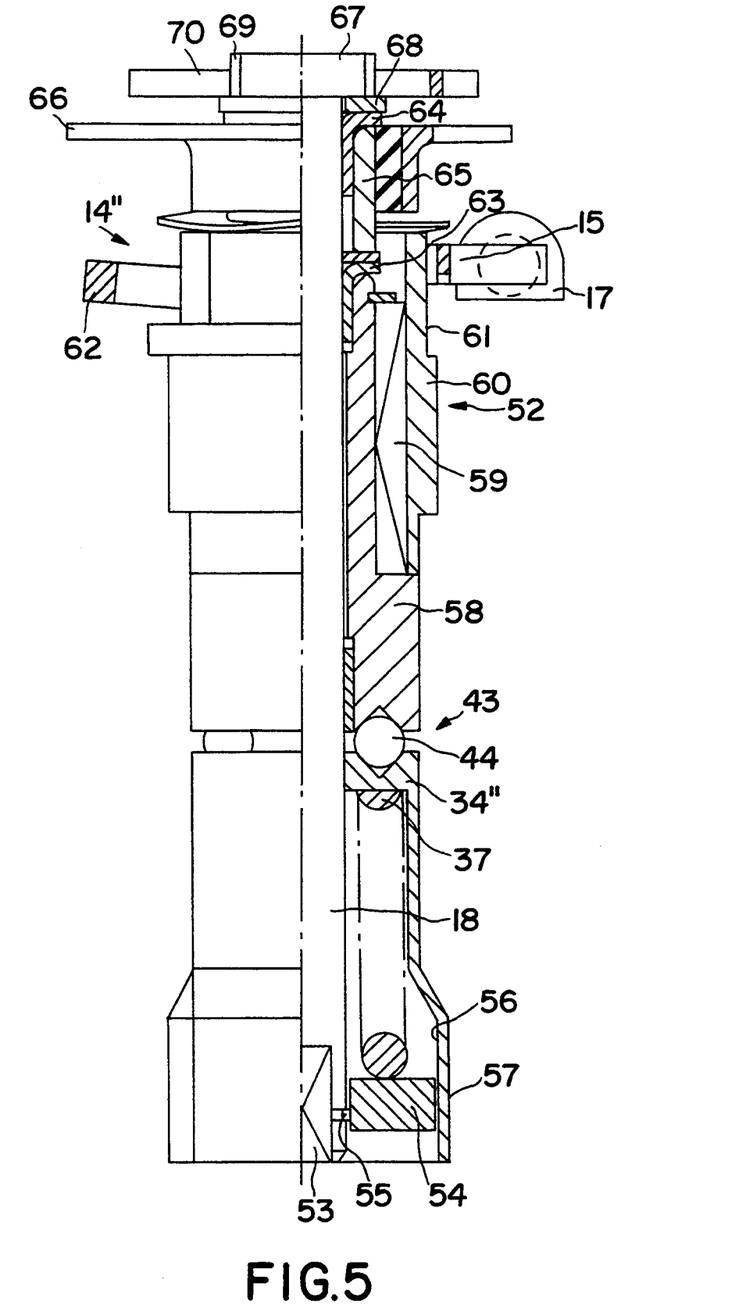
FIG. 5 is another embodiment of a rotating drive.

According to another embodiment, shown in FIG. 5, the rotating drive 14" comprises a spindle 18, whose short end region facing the brake disk comprises flats 53. In this region the spindle 14" is surrounded by an annulus 54 which has an inner profile matching the flats 53 and which is thus coupled at least twist-proof to the spindle 18. A retaining ring 55, embedded into the spindle 18 and serving as a stop, prevents the annulus 54 from sliding off the spindle 18 in the direction of the brake disk 1. The outside of the annulus 54 has a non-cylindrical longitudinal profile, which extends axially movably, but not rotatably, into a corresponding internal, non-cylindrical longitudinal profile 56 of an output bushing 34", which is mounted pivotally and axially movably on the spindle 18. The longitudinal profiles are preferably multi-surface profiles, in particular hexagonal profiles; opposite the internal longitudinal profile 56 of the output bushing 34" is a matching, non-cylindrical longitudinal profile 57 on the outside of the output bushing 34". The two longitudinal profiles 56 and 57 of the output bushing 34" extend over an expanded longitudinal region of the latter. The external longitudinal profile 57 extends into a matching inner profile of the adjusting spindle (not shown in FIG. 5), thus coupling these two parts longitudinally movably, but not rotatably. Braced on the annulus 54 is a pre-stress spring 37 which, on its other end, rests on an inner shoulder of the output bushing 34" and loads the latter in the direction away from the brake disk. Following the output bushing 34" an inner bushing 58, which serves as the second bushing and belongs to a sleeve one-way freewheel 59 forming a one-way revolving coupling 52, is rotatably mounted on the spindle 18. The blocking bodies of the sleeve one-way freewheel may be conventional balls, rollers or the like. The opposing faces of the output bushing 34" and the inner bushing 58 have recesses distributed over the circumference and with which balls 44 engage in such a manner as to form an axial ball approach coupling 43 that is prestressed by the pre-stress spring 37, as shown and described in detail with respect to FIG. 4. This ball approach coupling 43 serves as the torque limit coupling for the torque, which can be transferred between output bushing 34" and the inner bushing 58. The ball approach coupling 43 functions in the same manner as described with respect to FIG. 4.

An end region of the outer bushing 60, which faces away from the brake disk, and which represents a first bushing and belongs to the sleeve one-way freewheel 50, bears key faces 61, which may be flats. In the region of the key faces 61, a ring or fork-shaped section of a drive lever 15 envelops the outer bushing 60 in such a manner that the drive lever 15 is coupled to the outer bushing 60 relative to its axis so as to be tiltable, at most rotatable to a limited extent. The free end of the drive lever 15 is connected in the manner of a ball joint to a stop pin 17, as described above. The aforementioned tilt option can absorb the tilt movements, introduced on the drive lever 15 by means of the traverse and the stop pin 17 and the ball joint arrangement. A rotating play, dimensioned in accordance with the desired application stroke of the disk brake, can be provided between the drive lever 15 and the outer bushing 60 in the region of the key faces 61. The adjusting spindle 7 envelops the rotating drive 14 up to a maximum of one play distance in front of the drive lever 15. As the brake shoes wear, the adjusting spindle screws itself up to the brake disk, whereas the rotating drive 14 retains its axial position. However, the region of the longitudinal profile 57 remains even with maximum wear in the adjusting spindle 7 and remains coupled relatively non-rotatably to the latter.

Facing away from the brake disk, the inner bushing 58 rests on the face of a sleeve bearing ring 63, which is axially movable on the spindle 18 and between which and another, largely identical sleeve-bearing ring 64 a retaining ring 65 is clamped. One or both of the sleeve bearing rings 63 and/or 64 can be guided non-rotatably on the spindle 18. The retaining ring 65 is held by means of an elastomer bearing ring at the caliper or a ring 66, connected securely to the caliper, such that its own movements are limited, whereby the spindle 18 can be deflected cardanically to a limited degree. The sleeve bearing ring 64 is braced on its other side against an end side flange 67 of the spindle 18. Thus, the pre-stress spring 37 also clamps the sleeve bearing rings 63 and 64 against the retaining ring 65. An intermediate ring 68 can be incorporated between the sleeve bearing ring 64 and the flange 67.

The configuration and design of the sleeve bearing rings 63 and 64 with respect to the spindle 18 should be such that the spindle 18 has a friction lock against rotation to the caliper 2 which exceeds the freewheel resistance of the one-way revolving coupling 52. The difference in torque between the two can be greater than one power of ten.

The circumference of the flange 67 has axial teeth 69, which mesh with the inner teeth of a gear wheel 70 enveloping the flange 67. The gear wheel 70 is part of the synchromesh device; it can mesh with a toothed belt, a chain or another gear wheel. To reset when replacing the brake lining, the spindle can have from the direction of the flange-sided face a blind bore (not illustrated) with key faces, in particular a recess having a hexagonal cross-section, in order to interact with a socket head wrench as the rotating tool. The spindle 18 does not have to project laterally beyond the caliper; it can be covered on the flange side by a cover mounted on the caliper.

The operating mode and function of the rotating drive 14" according to FIG. 5 corresponds largely to that of the rotating drive 14' according to FIG. 3, so that further explanations are unnecessary.

Of course, combinations or the exchange of design details between the rotating drive 14" with the rotating drives 14 and 14' are also possible.

The stress on the toothed belt 12 is kept low, since it has to transfer merely the rotation, caused by the rotating drives 14, 14', 14" on the adjusting spindle 7, to the adjusting spindle 8, and thus serves only to drive the latter, not both adjusting spindles. There does not have to be a toothed belt 12 as the synchromesh device for the two adjusting spindles 7 and 8; a chain drive or a gear wheel coupling of the two adjusting spindles 7 and 8 would do as well.

When a rotating drive 14, 14' or 14" according to FIGS. 2, 3 or 5 is used for a disk brake without traverse, with only one adjusting spindle coupled adjustably directly or by way of a spacer to the cam of the cam lever, the synchromesh device with its components can be omitted. As a modification of the embodiments described above, each of adjusting spindles 7 and 8 can be equipped with its own rotating drive 14, 14', or 14"; the spindles can have the identical effect for resetting the play during brake application or alternatively, one during brake application and the other during release. It is also possible to configure one or both rotating drives 14, 14' or 14" in such a manner that they are not effective during brake application, but only during release.

We claim:

1. A disk brake for motor vehicles comprising:

a caliper which reaches over a brake disk, said caliper being provided on one side thereof with a clamping mechanism;

said clamping mechanism comprising a cam lever which can be swivelled around an axis of rotation extending parallel to a plane of said brake disk, said cam lever comprising a cam which is coupled to at least one adjusting spindle which extends within said caliper at least approximately at right angles to said plane of said brake disk;

said at least one adjusting spindle extending at least approximately at right angles to said plane of said brake disk and being adjustably screwed to said cam or to a spacer;

said spacer being movable by said cam for bracing a brake lining against a a brake disk-sided end of said spacer;

said brake lining being movable relative to said caliper transversely to said brake disk, wherein a rotating drive is provided for adjustment of release play between said brake disk and said brake lining, said rotating drive being actuatable by a swivel stroke of said cam lever, said rotating drive being disposed in an axial recess of said adjusting spindle which is open at least on a side facing away from said brake disk; and wherein an output member of said rotating drive is coupled relatively non-rotatably, but axially movably to said adjusting spindle.

2. Disk brake as claimed in claim 1, wherein said spacer is a traverse which extends parallel to said plane of the brake, each end of said spacer being screwed to an adjusting spindle, and wherein said two adjusting spindles are coupled together so as to be twist-proof by a synchromesh device, only one of said adjusting spindles being coupled to a rotating drive which can be driven by said cam lever by way of a swivel drive, said synchromesh device forming a rotating drive for the other adjusting spindle.

3. Disk brakes as claimed in claim 1 or 2, wherein said rotating drive is mounted on an end thereof which faces away from said brake lining and protrudes beyond said adjusting spindle a radially bulging drive lever, the end of which is coupled by way of a stop coupling to a stop pin mounted on said cam lever.

4. Disk brake, as claimed in claim 3, wherein said rotating drive comprises a spindle which reaches through a bore of said caliper or of a bushing inserted in said caliper with radial play, bridges by a sealing ring and comprising on both sides of said bore flanges of which at least one is braced against said caliper or said bushing by insertion of a spring.

5. Disk brake as claimed in claim 4, wherein said drive lever is connected to a first bushing which can be rotated relative to said spindle, said first bushing being coupled by way of a one-way revolving coupling, blocking in a reset direction of rotation, to a second bushing rotatably supported on said spindle, said second bushing being coupled by way of a torque limiting coupling to an output bushing which is non-rotatably mounted to said second bushing on said spindle, and wherein said output bushing is coupled to said adjusting spindle receiving said bushing so as to be axially movable, but not rotatable.

6. Disk brake as claimed in claim 5, wherein said output bushing comprises at least one section with an external, non-cylindrical longitudinal profile which is guided in a corresponding inner profile of said adjusting spindle.

7. Disk brake as claimed in claim 6, comprising a spring stressing said output bushing in the closing direction of said ball approach coupling and braced against an annulus which is intercepted by a stop, in a relaxation direction of said spring against said spindle which penetrates it non-rotatably by means of flattenings, wherein the section of said output bushing comprises also internally said non-cylindrical longitudinal profile and wherein said annulus comprises a corresponding, non-cylindrical profile by means of which it can be moved axially, but relatively non-rotatably at said internal longitudinal profile of said output bushing.

8. Disk brake as claimed in claim 7, wherein said spindle comprises on each side of a retaining ring which surrounds said spindle adjacent its end facing away from said brake disk and is mounted movably on said caliper by way of an elastomer bearing ring, a radially bulging sleeve bearing ring, the sleeve bearing ring which faces said brake disk being moved axially and resting on the face which faces away from said brake disk and belongs to said inner bushing of said sleeve one-way freewheel, and the sleeve bearing ring which faces away from said brake disk the sleeve bearing ring which faces away from said brake disk being intercepted against a flange of said spindle.

9. Disk brake as claimed in claim 8, wherein said flange intercepting said sleeve bearing ring forms the end of said spindle that faces away from said brake disk and comprises on its circumference axial teeth which mesh with matching internal axial teeth on a gear wheel which envelops said flange and which belongs to said synchromesh device.

10. Disk brake as claimed in claim 5, wherein said spindle comprises, on its end facing away from said brake lining, surfaces for positioning a rotating tool.

11. Disk brake as claimed in claim 10, wherein said output bushing is stressed in the direction of said second bushing by a spring which is penetrated by and braced against said spindle.

12. Disk brake as claimed in claim 11, wherein said spring is braced against a nut which is screwed adjustably to said spindle.

13. Disk brake as claimed in claim 5, wherein said torque limiting coupling is a conical coupling on adjoining faces of said second bushing and said output bushing.

14. Disk brake as claimed in claim 13, wherein a second conical coupling stressed in a closing direction by said spring is positioned between said spindle and said second bushing.

15. Disk brake as claimed in claim 5, wherein said one-way revolving coupling is a ball approach coupling which comprises balls arranged between faces of said second bushing that face each other and said output bushing and which reach into depressions of said two bushings that face each other and follow in succession in a circumferential direction.

16. Disk brake as claimed in claim 15, wherein said depressions comprise in the circumferential direction of said bushings inclined abutting surfaces for said balls.

17. Disk brake as claimed in claim 5 or 10, wherein said first bushing is an outer bushing and said second bushing is an inner bushing of a one-way freewheel, and wherein said spindle is coupled by way of at least one friction rotating coupling to a twist-proof part, a freewheeling torque of said one-way freewheel being less than a torque which can be transferred by said friction coupling.

18. Disk brake as claimed in claim 17, wherein said torque limiting coupling is the axial ball approach coupling between the facing faces of said inner bushing of said one-way freewheel and said output bushing which is spring loaded in the contact direction to said inner bushing.

19. Disk brake as claimed in claim 17, wherein said drive lever comprises a section which envelops said outer bushing of said one-way freewheel and which is coupled by means of the key faces at most rotatably to a limited degree, but tiltably to said outer bushing.

20. Disk brake as claimed in claim 5 or 10, wherein the torque to be transferred from said torque limiting coupling can be adjusted by adjusting the axial pressure between said second bushings and said output bushing which is mounted axially movably on said spindle.

21. Disk brake as claimed in claim 5, wherein, for mounting said output bushing axially and non-rotatably and said spindle, both said output bushing and said spindle comprise longitudinal grooves which face each other and in which blocking balls are supported.

22. Disk brake as claimed in claim 5, wherein said output bushing comprises at least one radially bulging bolt which extends into at least one inner longitudinal groove of said adjusting spindle.

23. Disk brake as claimed in claim 5, wherein said one-way revolving coupling is a loop spring which surrounds aligned, adjoining, cylindrical sections of said first and second bushings with radial pre-stress.

* * * * *

UNITED STATES PATENT AND TRADEMARK OFFICE
CERTIFICATE OF CORRECTION

PATENT NO.   :   5,353,896
DATED        :   October 11, 1994
INVENTOR(S)  :   Baumgartner et al It is certified that error appears in the above-indentified patent and that said Letters Patent is hereby corrected as shown below:

Title page, item [73] "Feur" should be --Fuer--.

In column 10, line 44, claim 3, after "spindle" insert --on said caliper and bears between this mounting and said adjusting spindle--.

In column 10, line 50, claim 4, change "bridges" to --bridged--.

Signed and Sealed this

Twelfth Day of December, 1995

Attest:

BRUCE LEHMAN

Attesting Officer

Commissioner of Patents and Trademarks